United States Patent [19]
Leshay et al.

[11] Patent Number: 6,075,833
[45] Date of Patent: Jun. 13, 2000

[54] METHOD AND APPARATUS FOR COUNTING SIGNAL TRANSITIONS

[75] Inventors: Bruce A. Leshay, West Boylston; Bruce Buch, Westboro, both of Mass.

[73] Assignee: Quantum Corporation, Milpitas, Calif.

[21] Appl. No.: 09/204,763

[22] Filed: Dec. 2, 1998

[51] Int. Cl.[7] .................................................. H03K 21/00
[52] U.S. Cl. .............................. 377/16; 377/26; 377/34
[58] Field of Search .................................. 377/34, 16, 26

[56] References Cited

U.S. PATENT DOCUMENTS 5,555,524 9/1996 Castellano ............................. 365/221
5,894,567 4/1999 Dodd et al. ............................. 395/551
5,978,868 4/1999 Maas ......................................... 710/52

*Primary Examiner*—Margaret R. Wambach
*Attorney, Agent, or Firm*—Fish and Richardson

[57] ABSTRACT

A circuit for counting events occurring between two different clock domains includes a gray code counter having at least two stages. The gray code counter is incremented by the event to be counted. Dual rank synchronizer circuit and delay flip/flops are coupled to the counter. The circuit includes a comparison logic circuit fed by outputs from the dual rank synchronizers and the delay flip/flops to produce an output signal having a binary value corresponding to a number of events that occurred between transitions of the second clock.

9 Claims, 2 Drawing Sheets

METHOD AND APPARATUS FOR COUNTING SIGNAL TRANSITIONS

BACKGROUND

This invention relates generally to logic circuits and more particularly to clocked circuits.

Computer systems generally operate by performing data transfers between different devices coupled in the system. Often, computer systems include interconnected synchronous devices, that is, devices that use a common signal referred to as a "clock signal" to synchronize timing of circuits in the device. A digital system will have many separate devices some of which may operate with different clock signals that are not synchronous to one another. Moreover, digital systems may also include asynchronous devices i.e., devices that rely upon an occurrence of an asynchronous event. Often, it is necessary to perform data transfers between two synchronous devices each operating with different clock signals (i.e., different clock domains or between a synchronous and an asynchronous device.

An example of such a device is a bus adapter including a first in/first out (FIFO) memory that is loaded or written to from an output device in one clock domain and read by an input device operating under a different clock domain. It is often the case that circuits in either clock domain may need to know the current status of the FIFO in order to operate. For example, one type of information which may be required by circuits in either clock domain is the number of transitions or events that have occurred (e.g., the number of words that have been loaded into the FIFO or read from the FIFO) over a certain interval.

SUMMARY

According to one aspect of the invention, a circuit for counting events occurring in a first clock domain by a clock signal in a second clock domain includes a gray code counter having at least two stages. The gray code counter is incremented by the event to be counted. The circuit also includes a synchronizer circuit for each stage of the gray code counter with each synchronizer circuit coupled to an output of the gray code counter stage and clocked by the second clock domain signal. The circuit also includes a logic circuit coupled to the synchronizer circuit to produce from outputs of the synchronizer circuit a value indicative of the number of the events that occurred between clock transitions of the second clock signal.

According to another aspect of the invention a circuit for counting events occurring between two different clock domains includes a gray code counter having at least two stages. The gray code counter is incremented by the event to be counted. The event is synchronous to a first one of the clock domains. The circuit also includes a dual rank synchronizer circuit for each stage of the gray code counter with each dual rank synchronizer circuit having an input coupled to a corresponding output of a stage of the gray code counter. The dual rank synchronizers are synchronized to a second one of the clock domains. The circuit also includes a delay flip/flop for each of the dual rank synchronizers, the delay flip/flops having an input coupled to an output of the corresponding dual stage synchronizers. The circuit includes comparison logic circuit fed by outputs from the dual rank synchronizers and the delay flip/flops to produce an output signal having a binary value corresponding to a number of events that occurred between the first and second clock domains.

According to a further aspect of the invention a method for counting events occurring between first and second different clock domains includes incrementing a counter that changes state a bit at a time by an event to be counted. The counter is synchronous to a clock signal that is synchronous to a first one of the clock domains. The method also includes synchronizing each stage of the counter to a second one of the clock domains and delaying an output from the synchronizing for at least one clock period of the second one of the clock domains. The method also includes comparing outputs from the synchronizing and the delaying to produce an output signal having a binary value corresponding to a number of events that occurred between a period of the second clock domain.

One or more advantages are provided by the invention. The gray code counter increments or changes only a single bit for every count increment. The gray code counter can be provided with a sufficient number of stages to hold a maximum number of events that could possibly occur in a time interval between the clock pulses of the domain that receives the information. The required number of stages can be empirically determined based upon the frequency of events that can occur in the sending domain in accordance with the clock frequency in the receiving domain. Therefore a slow clock domain can be used to count events that occur in a faster clock domain.

DETAILED DESCRIPTION

Figure 1:
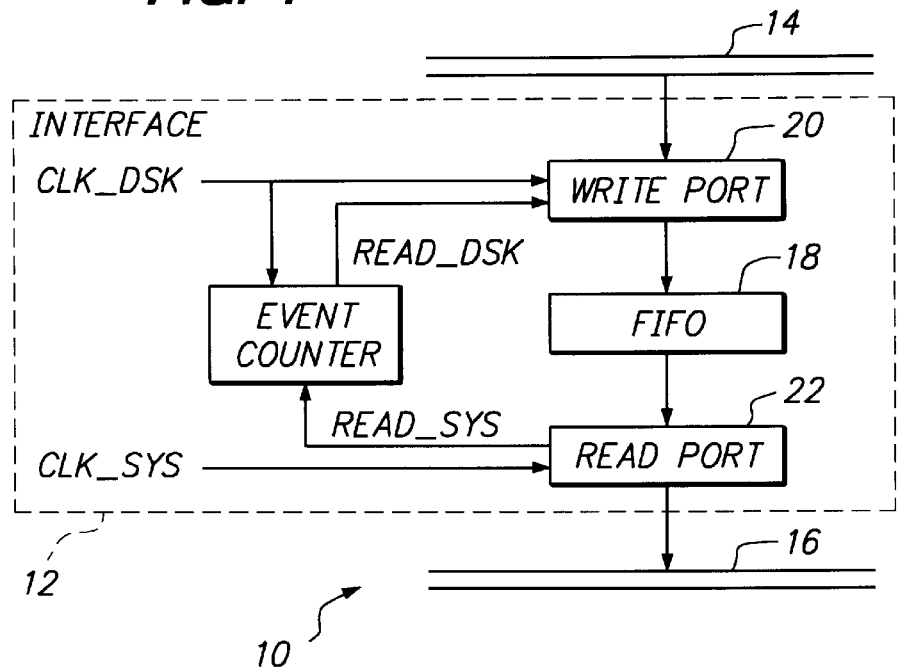
FIG. 1 is a block diagram of an interface circuit including an event counter.

Referring now to FIG. 1, a computer system 10 includes an interface 12 coupled between a storage bus 14 and a system bus 16. Storage bus 14 may be a synchronous bus operating under a first clock signal or an asynchronous bus, whereas, system bus 16 is a synchronous bus that may operate under a second different clock signal. The system bus 16 is coupled to a computer 18. The interface 12 can be a bus adapter used to manage data transactions between buses 14 and 16. The interface 12 includes a buffer device such as a first in/first out (FIFO) memory 18, a disk bus interface port 20, and a system bus interface port 22. The disk bus interface port 20 couples the storage bus 14 for read/write operations to the FIFO 18, whereas the system bus interface port 22 couples system bus 16 to the FIFO 18 for read/write operations.

The interface 12 also includes an event counter 24 fed by the clock signal CLK_DSK which is the disk bus interface port clock signal. Clock signal CLK_SYS is the system clock signal. Clock signals CLK_DSK and CLK_SYS can be different clock signals that are asynchronous to each other and may have different clock frequencies. The interface 12 includes the event counter 24 to generate an event signal such as "READ_DSK" that provides a count of the number of words read from the FIFO 18 by the system bus interface port 22, synchronized to the disk bus clock signal CLK_DSK. The event counter 24 produces a count for each pulse of a signal, (READ_SYS) for use by the disk bus interface port 20. Accordingly, the event counter 24 synchronizes events (READ_SYS) generated in one clock domain (clock signal CLK_SYS domain) to produce a signal (READ_DSK) corresponding to the count of such events for use by a circuit e.g., disk interface port 20 operating in the other clock domain (clock signal, CLK_DSK domain).

Figure 2:
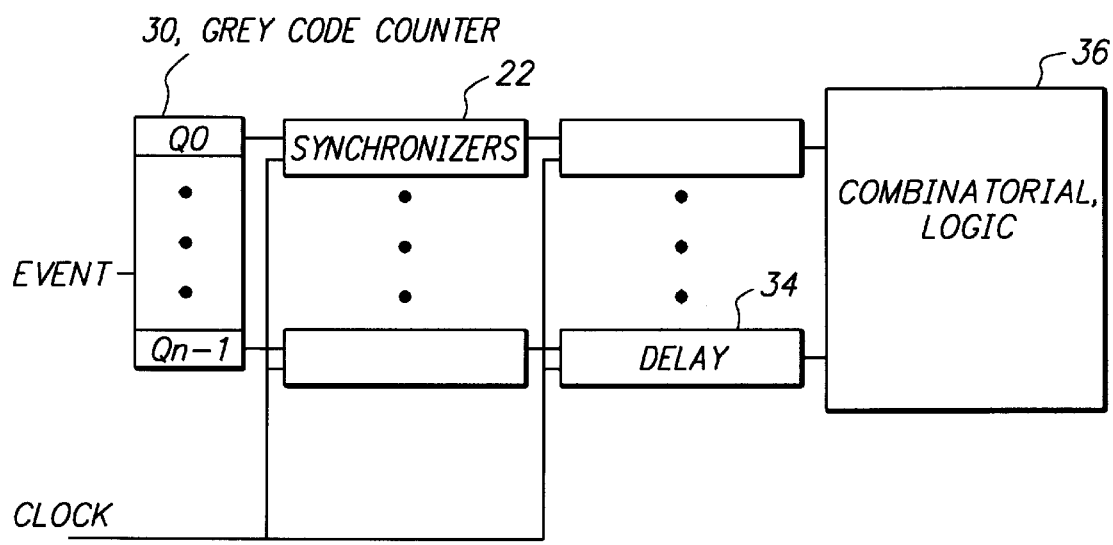
FIG. 2 is a block diagram of the event counter shown in FIG. 1.

Referring now to FIG. 2, the event counter 21 includes a gray code counter 30 having a plurality of stages $Q_0$–$Q_{n-1}$ and corresponding synchronizers 32 having inputs coupled to the outputs of the stages $Q_0$–$Q_{n-1}$ of the counter 30. The synchronizers 32 have outputs which are coupled to corresponding inputs of delay elements 34 such as D-type flip/flops. The D-type flip/flops 34 and synchronizers 32 are clocked by a clock signal "CLOCK" corresponding to the clock signal of the receiving domain. Thus, for example, referring back briefly to FIG. 1, the event counter 24 is configured to produce the signal READ_DSK which is a count signal, synchronized to the receiving clock domain clock signal CLK_DSK (FIG. 1). READ_DSK is produced by event counter 24 in response to signal "EVENT" a signal synchronized to the clock domain CLK_SYS (e.g., the system bus interface port clock). "Event" produces a pulse for each occurrence of an event from the sending domain such as reading a word from the FIFO 18 by the system bus interface port 22.

The gray code counter 30 is characterized as a counter that increments or changes only a single bit for every count increment. The gray code counter 30 has a sufficient number of stages to hold a maximum number of events that could possibly occur in a time interval between clock pulses of the receiving clock domain. Thus, the required number of stages are empirically determined, based upon the frequency of events that can occur in the sending domain and the clock frequency in the receiving domain.

The synchronizers 32 synchronize the outputs of the gray code counter 30 to the clock domain of the receiving device. The synchronizers 32 are preferred over typical flip-flops since they are less likely to enter a meta-stable state due to a non synchronized signal transition. That is, when a signal synchronized in one clock domain is received by a typical flip-flop in another clock domain, if the signal transitions within a time interval bounded by the setup and hold time of this typical flip-flop, there is a finite chance that the typical flip-flop could oscillate or enter a meta-stable state. This is minimized by using synchronizers. Thus, although typical flip-flops could be used synchronizing flip-flops are preferred.

The delay elements 34 are used to further delay the outputs of the synchronizers 32 for one additional clock period.

This enables comparison logic 36 to compare the output from the synchronizer circuits and the outputs of the delay elements to determine a binary number indicative of the number of events which have occurred between pairs of clock edges of the receiving clock.

The logic circuit 36 uses combinatorial logic such as will be described in conjunction with FIG. 3 performs an effectively subtraction, modulo the bit width, of the delayed count from the count at the output of the synchronizers. That is, the combinatorial logic 36 performs an effective subtraction of synchronized and delayed values counted by the gray code counters 30. This corresponds to the number of events that have occurred between "CLOCK" transitions. The logic circuit 36 produces an output value signal "COUNT" that corresponds to a binary value representative of the number of events which occurred between clock periods of the receiving clock domain. Thus, by providing an appropriate number of stages of the gray code counter 30, in accordance with the maximum rate of events in the sending domain and the frequency of the clock in the receiving clock domain, the receiving clock domain frequency can be made arbitrarily low and the event counter 24 will still accurately count the number of pulses on the signal "EVENTS" which have occurred between clock periods in the receiving clock domain.

Figure 3:
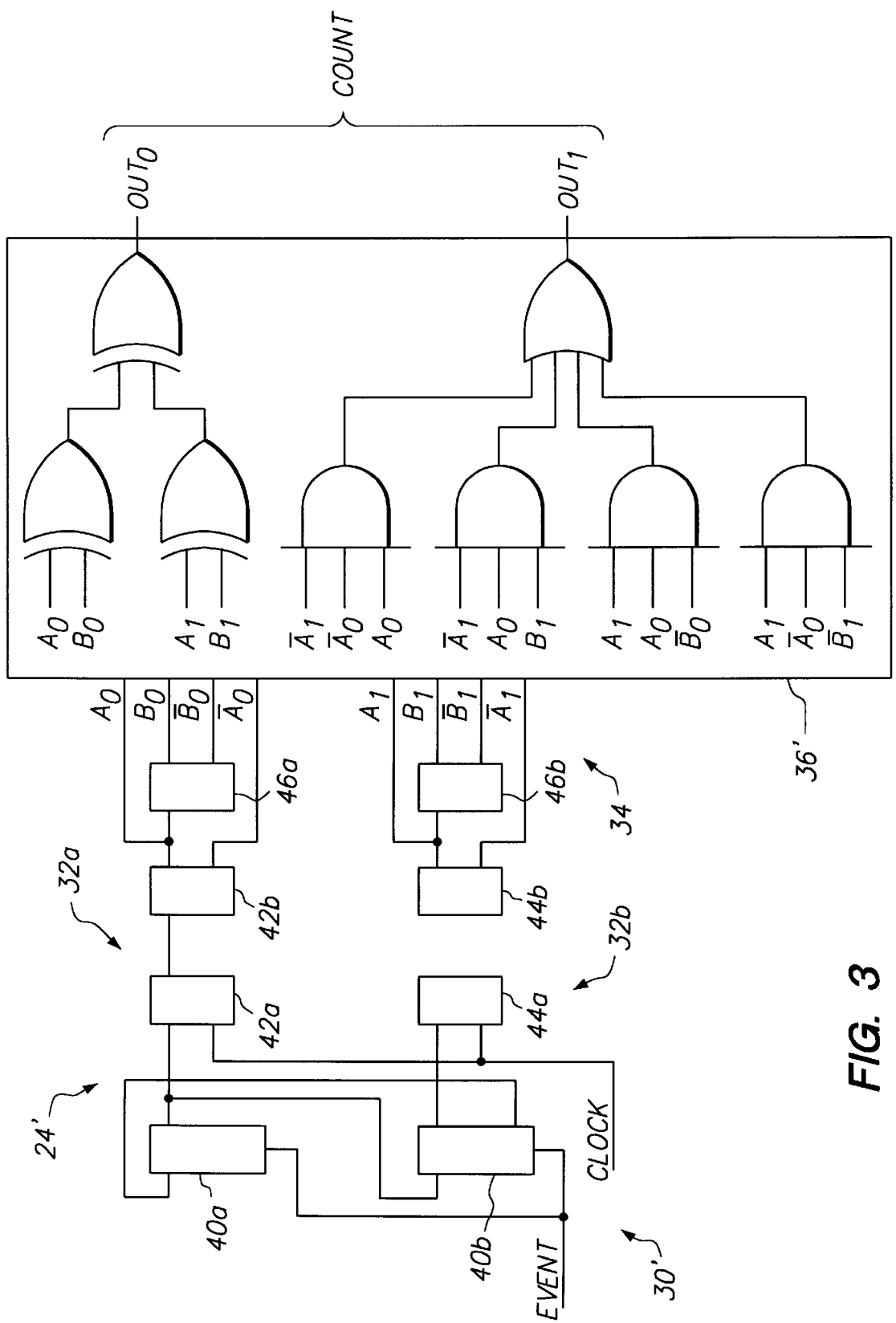
FIG. 3 is a block diagram of an embodiment of a two-stage event counter shown in FIG. 2.

Referring now to FIG. 3, an example 24' of the event counter 24 is a two bit Johnson counter 30' (gray code counter) comprised of a pair of flip/flops 40a, 40b. The Johnson counter 30' has an output of a first flip/flop 40a coupled to an input of the other flip/flop 40b with the complemented output of the succeeding flip/flop 40b coupled to the input of the first flip/flop 40a. The stages 40a and 40b are each fed by the signal "EVENT" as a clock signal. The Johnson counter 30' is incremented by the signal "EVENT" (which could be the signal READ_SYS from FIG. 1) and changes its state one bit at a time for each transition in the signal "EVENT." The outputs from the Johnson counter are coupled to a pair of dual rank synchronizers 32a, 32b. Each dual rank synchronizer 32a, 32b includes a pair of flip/flops 42a, 42b and 44a, 44b, respectively, coupled as shown. Use of dual rank synchronizers further reduces the likelihood that a signal transition could cause the synchronizer to oscillate or otherwise become unstable.

The outputs from the last rank of the synchronizer 42 are fed to a delay circuit 34 comprised of flip/flops 46a and 46b. The outputs of the flip/flops 46a, 46b as well as outputs from the last rank of the synchronizers 42b, 44b are fed to a combinatorial logic circuit 36 comprised of "AND" gates, "OR" gates and "Exclusive OR" gates, as shown, to produce output signals OUT 0 and OUT 1. The output signals OUT 0 and OUT 1 provide a value signal "COUNT" indicative of the number of transitions of the signal "EVENT" that occurs between successive edges of the clock signal CLK_DSK. The combinatorial logic circuit 36 implements the following logic equations:

$OUT_0 = (A_0 \oplus B_0) \oplus (A_1 \oplus B_1)$                                      Equation 1

$OUT_1 = A_1' \cdot A_0' \cdot B_0 + A_1' \cdot A_0 \cdot B_1 + A_1 A_0 \cdot B_0' + A_1 \cdot A_0' \cdot B_1'$                       Equation 2 where "$\oplus$" is a logical "EXCLUSIVE OR" operation, + is a logical "OR" operation, "·" is a logical "AND" operation, and "'" is a logical complement operation. These equations provide an effective subtraction operation between a count value of the gray code counter 30 from the output of the delay elements and the value of the gray code counter 30 at the output of the synchronizers 32. This arrangement permits the event counter 24 to count events that occur at a relatively high frequency (i.e., with a relatively fast clock using a relatively slow clock.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A circuit for counting events occurring in a first clock domain, by using a clock signal in a second clock domain comprises:

a gray code counter having at least two stages, the gray code counter incremented by the event to be counted;

a synchronizer circuit for each stage of the gray code counter with each synchronizer circuit coupled to an output of the gray code counter stage and clocked by the second clock domain signal; and a logic circuit coupled to the synchronizer circuit to produce from outputs of the synchronizer circuit a value indicative of the number of the events that occurred between transitions of the second clock.

2. The circuit of claim 1 wherein the logic circuit comprises a delay element for each of the synchronizer circuits and combinatorial logic that combines outputs from the synchronizer circuits and the delay element to produce the value indicative of the number of events.

3. The circuit of claim 2 wherein the combinatorial logic effectively subtracts synchronized and delayed values counted by the gray code counters.

4. The circuit of claim 1 wherein the synchronizer circuit for each stage is a flip-flop.

5. The circuit of claim 4 wherein each flip-flop in the synchronizer circuit is a synchronizer flip-flop.

6. A circuit for counting events occurring between two different clock domains comprises:

a gray code counter having at least two stages, the gray code counter incremented by the event to be counted synchronous to a first one of the clock domains;

a dual rank synchronizer circuit for each stage of the gray code counter with each dual rank synchronizer circuit having an input coupled to a corresponding output of a stage of the gray code counter and synchronized to a second one of the clock domains;

a delay flip-flop for each of the dual rank synchronizers, such delay flip-flops having an input coupled to an output of the corresponding dual stage synchronizers;

a comparison logic circuit fed by outputs from the dual rank synchronizers and the delay flip-flops to produce an output signal having a binary value corresponding to a number of events that occurred between the first and second clock domains.

7. The circuit of claim 6 wherein the gray code counter is a Johnson counter.

8. The circuit of claim 6 wherein the gray code counter has two stages, produces signals $OUT_0$ and $OUT_1$ indicative of the value of the number of events and wherein the comparison logic implements the following logic equations:

$$OUT_0 = (A_0 \oplus B_0) \oplus (A_1 \oplus B_1)$$

$$OUT_1 = A_1' \cdot A_0' \cdot B_0 + A_1' \cdot A_0 \cdot B_1 + A_1 \cdot A_0 \cdot B_0' + A_1 \cdot A_0' \cdot B_1'$$

where $A_0$ and $A_1$ are the outputs from the dual rank synchronizers corresponding to the zero and first stage of the Johnson counter and $B_0$ and $B_1$ are the outputs from the delay elements corresponding to the zero and first stages of the Johnson counter.

9. A method for counting events occurring between first and second different clock domains comprises:

incrementing a counter that changes state a bit at a time by an event to be counted with a clock signal that is synchronous to a first one of the clock domains;

synchronizing each stage of the counter to a second one of the clock domains;

delaying an output from the synchronizing for at least one clock period of the second one of the clock domain; and comparing outputs from synchronizing and the delaying to produce an output signal having a binary value corresponding to a number of events that occurred between a period of the second clock domain.

* * * * *